(12) United States Patent
Yokoi

(10) Patent No.: US 9,738,323 B2
(45) Date of Patent: Aug. 22, 2017

(54) VEHICLE REAR PORTION STRUCTURE

(71) Applicant: TOYOTA JIDOSHA KABUSHIKI KAISHA, Toyota-shi, Aichi (JP)

(72) Inventor: Yoshimitsu Yokoi, Toyota (JP)

(73) Assignee: Toyota Jidosha Kabushiki Kaisha, Toyota (JP)

( * ) Notice: Subject to any disclaimer, the term of this patent is extended or adjusted under 35 U.S.C. 154(b) by 0 days.

(21) Appl. No.: 15/035,320

(22) PCT Filed: Nov. 17, 2014

(86) PCT No.: PCT/JP2014/080837
§ 371 (c)(1),
(2) Date: May 9, 2016

(87) PCT Pub. No.: WO2015/080031
PCT Pub. Date: Jun. 4, 2015

(65) Prior Publication Data
US 2016/0272250 A1    Sep. 22, 2016

(30) Foreign Application Priority Data
Nov. 27, 2013    (JP) ................. 2013-245320

(51) Int. Cl.
*B62D 25/04*    (2006.01)
*B62D 25/02*    (2006.01)
*B62D 25/08*    (2006.01)

(52) U.S. Cl.
CPC ............. *B62D 25/04* (2013.01); *B62D 25/02* (2013.01); *B62D 25/087* (2013.01)

(58) Field of Classification Search
CPC ....... B62D 25/04; B62D 25/02; B62D 25/087
USPC ............................ 296/193.08, 203.04, 198
See application file for complete search history.

(56) References Cited

U.S. PATENT DOCUMENTS

| 1,867,851 | A | * | 7/1932 | Ledwinka | .............. | B62D 25/00 296/203.04 |
| 6,364,405 | B1 | * | 4/2002 | Kim | ..................... | B62D 25/087 296/203.01 |
| 7,083,225 | B2 | * | 8/2006 | Yakata | ................. | B62D 25/088 296/187.11 |

(Continued)

FOREIGN PATENT DOCUMENTS

| JP | 2008-239128 A | 10/2008 |
| JP | 2010-285019 A | 12/2010 |

(Continued)

*Primary Examiner* — Jason S Morrow
*Assistant Examiner* — E Turner Hicks
(74) *Attorney, Agent, or Firm* — Oliff PLC

(57) ABSTRACT

Falling-in deformation, in which a second quarter pillar deforms so as to fall toward a vehicle vertical direction lower side, is suppressed. Due to twisting input being applied to a vehicle, a second quarter pillar deforms so as to fall toward the vehicle vertical direction lower side. A connecting member, whose lower end portion is joined to a joined region of a wheel house and a lower end portion of a first quarter pillar, receives this falling-in deformation of the second quarter pillar. Accordingly, because the connecting member, whose lower end portion is securely fixed, receives the falling-in deformation of the second quarter pillar, the falling-in deformation of the second quarter pillar is effectively suppressed.

4 Claims, 7 Drawing Sheets

(56) References Cited

U.S. PATENT DOCUMENTS

| 8,528,966 B2* | 9/2013 | Kim | B62D 25/088 |
| | | | 296/198 |
| 8,690,218 B2* | 4/2014 | Kuhl | B62D 25/025 |
| | | | 296/193.08 |
| 2012/0223547 A1* | 9/2012 | Horiguchi | B62D 25/087 |
| | | | 296/193.08 |
| 2012/0286542 A1* | 11/2012 | Kakiuchi | B62D 25/087 |
| | | | 296/203.04 |
| 2013/0341970 A1 | 12/2013 | Shimizu et al. | |

FOREIGN PATENT DOCUMENTS

| JP | 2013-091373 A | 5/2013 |
| WO | 2012/121142 A1 | 9/2012 |

* cited by examiner

VEHICLE REAR PORTION STRUCTURE

TECHNICAL FIELD

The present invention relates to a vehicle rear portion structure.

BACKGROUND ART

Japanese Patent Application Laid-Open (JP-A) No. 2010-285019 discloses a vehicle rear portion structure in which both end portions of a connecting member that is disposed substantially horizontally are connected to a quarter inner front reinforcement whose lower end portion is joined to a wheel house outer panel, and to a side body outer extension that extends in the vertical direction along the side edge portion of a back door opening portion (refer to JP-A No. 2010-285019).

Here, when twisting input is applied to the body of the vehicle, the side body outer extension (D pillar, second quarter pillar) deforms so as to fall toward the vehicle vertical direction lower side.

This is a structure in which the connecting member that is disposed substantially horizontally receives, by bending (twisting) deformation, such falling-in deformation of the side body outer extension, and the quarter inner front reinforcement (C pillar, first quarter pillar) receives this bending (twisting) deformation of the connecting member. Accordingly, the connecting member cannot effectively exhibit an effect of suppressing falling-in deformation of the side body outer extension.

SUMMARY OF INVENTION

Technical Problem

In consideration of the above-described circumstances, an object of the present invention is to provide a vehicle rear portion structure that suppresses falling-in deformation in which a second quarter pillar deforms so as to fall toward a vehicle vertical direction lower side.

Solution to Problem

A first aspect of the present invention includes: a first quarter pillar that extends in a vehicle vertical direction at a vehicle rear side of a vehicle side portion, and whose lower end portion is joined to a wheel house; a second quarter pillar that is provided at a vehicle rear side of the first quarter pillar and extends in the vehicle vertical direction; and a connecting member that is joined respectively to the second quarter pillar and to a joined region of the first quarter pillar and the wheel house, and that connects the second quarter pillar and the joined region.

In the first aspect of the present invention, the connecting member, that is joined to the joined region of the first quarter pillar and the wheel house, receives falling-in deformation in which the second quarter pillar deforms to as to fall toward the vehicle vertical direction lower side due to twisting input being applied to the vehicle.

Accordingly, the connecting member, to which the joined portion at the side opposite the second quarter pillar is securely fixed, receives the falling-in deformation of the second quarter pillar. Therefore, falling-in deformation of the second quarter pillar is effectively suppressed.

In a second aspect of the present invention, in the structure of the first aspect, the connecting member is disposed at an acute angle with respect to the vehicle vertical direction as seen in a vehicle side view.

In the second aspect of the present invention, there is a structure in which the connecting member receives the falling-in deformation of the second quarter pillar more as axial force than as bending (twisting) deformation, and therefore, falling-in deformation of the second quarter pillar is suppressed more.

In the third aspect of the present invention, cross-sectional shape of the connecting member orthogonal to the length direction is a hat shape that opens toward the vehicle transverse direction inner side, an upper end portion of the connecting member is joined to a curved portion at the second quarter pillar, and a lower end portion of the connecting member is joined to a joined region of the wheel house and the lower end portion of the first quarter pillar.

In the fourth aspect of the present invention, the vehicle rear portion structure of the first aspect further includes a second connecting member, wherein cross-sectional shape of the second connecting member orthogonal to the length direction is a hat shape that opens toward the vehicle transverse direction inner side, an upper end portion of the second connecting member is joined to a curved portion at the second quarter pillar, and a lower end portion of the second connecting member is joined to a joined region of the wheel house and the lower end portion of the first quarter pillar.

Advantageous Effects of Invention

In accordance with the first aspect of the present invention, falling-in deformation, in which the second quarter pillar deforms so as to fall toward the vehicle vertical direction lower side, can be suppressed.

In accordance with the second through fourth aspects of the present invention, falling-in deformation, in which the second quarter pillar deforms so as to fall toward the vehicle vertical direction lower side, can be suppressed more.

DESCRIPTION OF EMBODIMENTS

Structure of Embodiment

Figure 1:
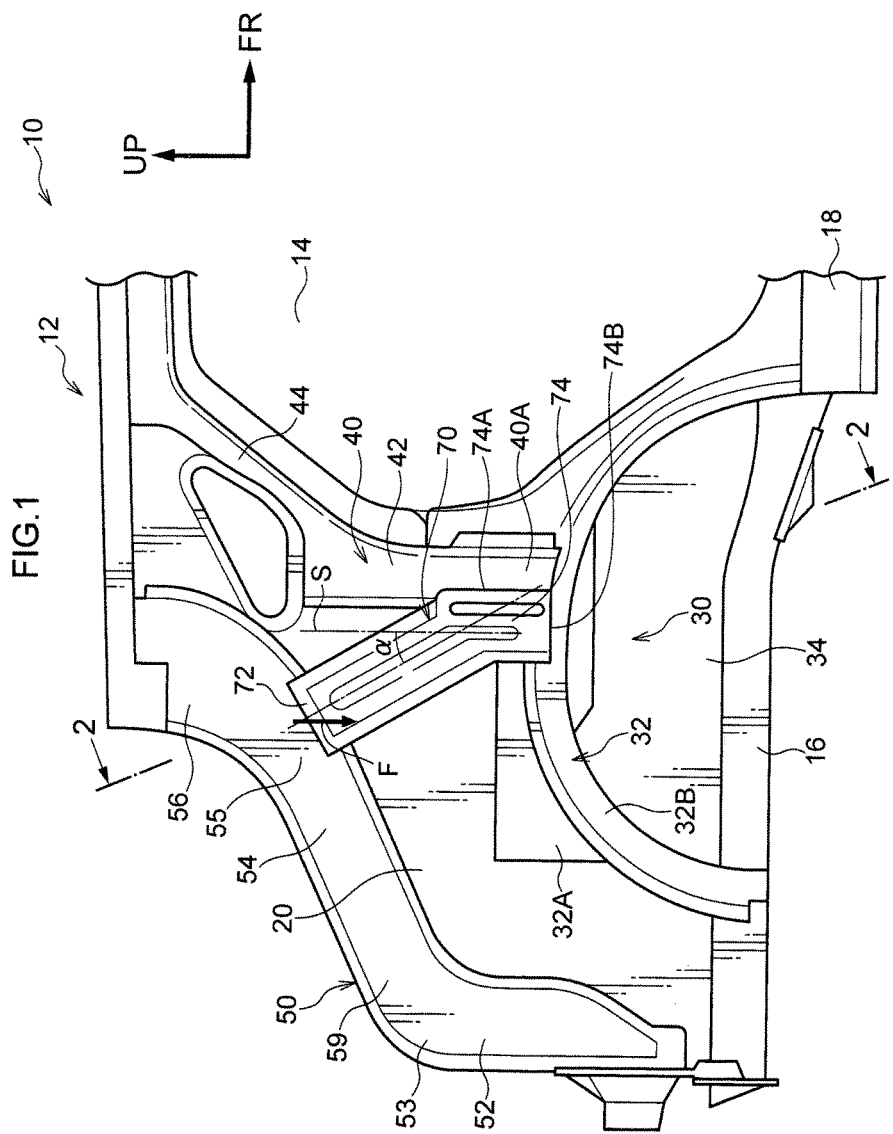
FIG. 1 is a side view in which a vehicle rear portion structure relating to an embodiment of the present invention is viewed from a vehicle transverse direction outer side.
Figure 2:
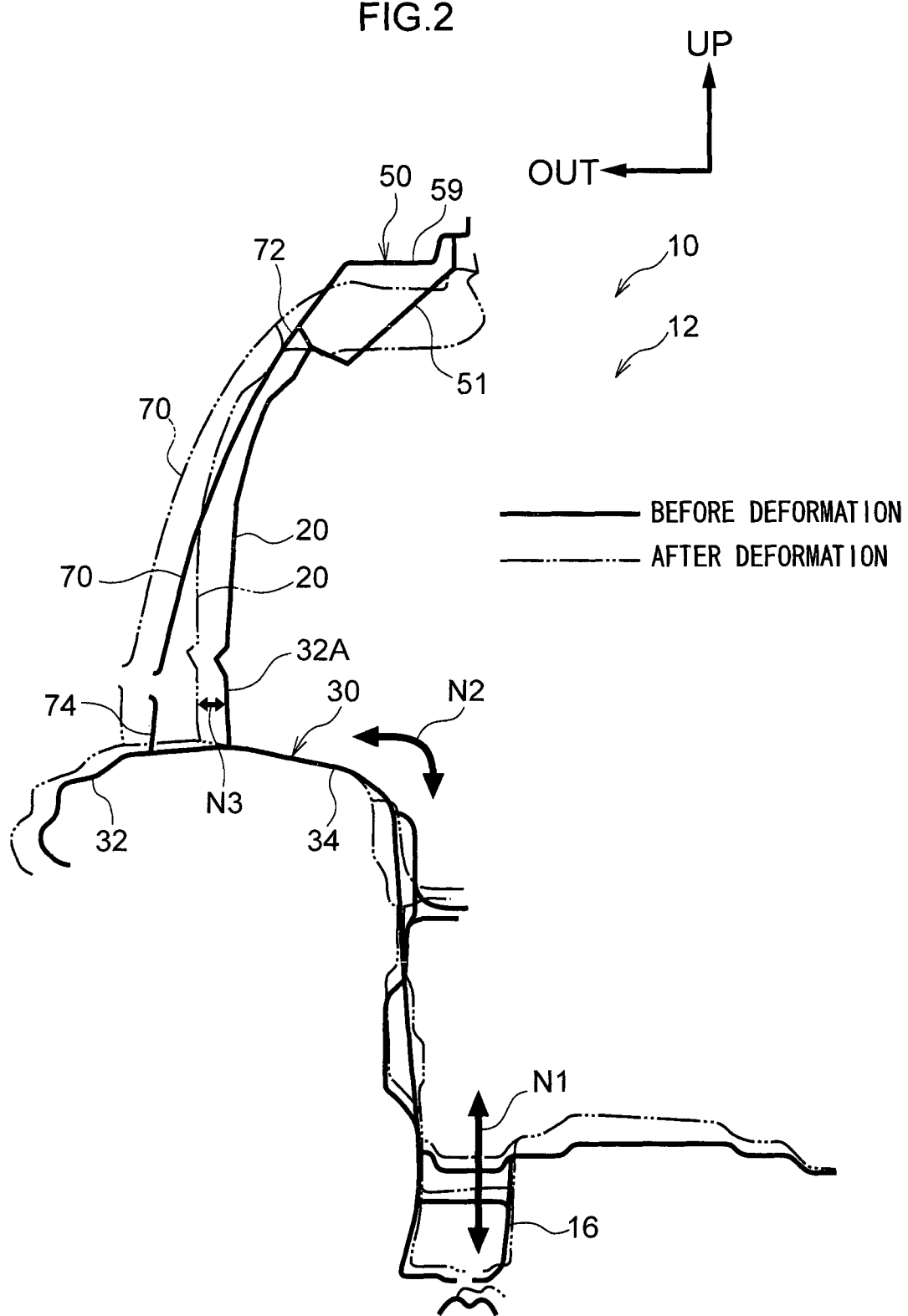
FIG. 2 is a cross-sectional view schematically showing the cross-section along line 2-2 of FIG. 1, for explaining states before deformation and after deformation of a roof side inner panel.

A vehicle rear portion structure relating to an embodiment of the present invention is described by using FIG. 1 and FIG. 2. Arrow FR, that is shown appropriately in these drawings, indicates the vehicle longitudinal direction front side, arrow UP indicates the vehicle vertical direction upper side, and arrow OUT indicates the vehicle transverse direction outer side. Note that, although the vehicle side portion at the right side in a case of facing toward the vehicle front side is illustrated in FIG. 1 and FIG. 2, the vehicle side portion at the left side has the same structure.

A vehicle 10, to which the vehicle rear portion structure relating to the embodiment of the present invention shown in FIG. 1 is applied, is a hatchback vehicle having a back door at the vehicle rear end portion thereof.

A roof side inner panel 20 is disposed at a vehicle side portion of a rear portion 12 of the vehicle 10 (see FIG. 2 as well). The roof side inner panel 20 is joined to a flange portion 32A of a wheel house outer 32 (see FIG. 2 as well), that is described later, of a wheel house 30.

The wheel house 30 is a member that covers the upper side of an unillustrated tire, and is structured by a wheel house inner 34 (see FIG. 2 as well) that structures the vehicle transverse direction inner side, and the wheel house outer 32 (see FIG. 2 as well) that structures the vehicle transverse direction outer side, being joined together. The wheel house 32 is a press-molded part that is formed from a single steel plate, and has the flange portion 32A that is shaped as a vertical wall, and an outer side cover portion 32B that is substantially arc shaped as seen in a vehicle side view. Further, the outer side cover portion 32B projects-out further toward the vehicle transverse direction outer side than the roof side inner panel 20 and the flange portion 32A, and is formed so as to run along the outer surface of an unillustrated tire.

A rear side member 16 is joined to the lower end portion of the wheel house 30. The rear side member 16 is disposed at the vehicle lower side of the wheel house 30 with the vehicle longitudinal direction being the length direction thereof. Further, a rocker 18 is formed continuously with the rear side member 16 at the vehicle front side of the rear side member 16.

An unillustrated rear suspension mounting portion is connected to the rear side member 16 at a position in the vicinity of the front side lower end portion of the wheel house 30. An unillustrated rear suspension is mounted to this rear suspension mounting portion.

A first quarter pillar (C pillar) 40 is provided at the vehicle upper side of the wheel house 30. The first quarter pillar 40 extends overall in the vehicle vertical direction along the side edge portion of a side door opening portion 14 of the vehicle side portion. A lower end portion 40A of the first quarter pillar 40 is joined to the upper portion of the wheel house 30.

In further detail, the first quarter pillar 40 is a structure having, as seen in a vehicle side view, a first pillar lower portion 42 that is joined to the wheel house 30 and extends substantially toward the vehicle vertical direction upper side, and a first pillar upper portion 44 that extends toward a vehicle obliquely upper front side.

Further, the cross-sectional shape, that is orthogonal to the length direction, of the first quarter pillar 40 is a hat shape that opens toward the vehicle transverse direction inner side. The first quarter pillar 40 forms a closed cross-sectional structure by being joined to the roof side inner panel 20 and the vehicle transverse direction outer side of the flange portion 32A of the wheel house outer 32.

A second quarter pillar (D pillar) 50 is provided at the vehicle rear side of the first quarter pillar 40. The second quarter pillar (D pillar) 50 extends on the whole in the vehicle vertical direction along the side edge portion of an unillustrated back door opening portion of the vehicle rear end portion.

In further detail, the second quarter pillar 50 is a structure having, as seen in a vehicle side view, a second pillar lower portion 52 that extends substantially toward the vehicle vertical direction upper side, a second pillar inclined portion 54 that extends toward a vehicle obliquely upper front side, and a second pillar upper end portion 56 that extends substantially toward the vehicle vertical direction upper side.

Further, as shown in FIG. 2, the second quarter pillar 50 forms a closed cross-sectional structure due to a second quarter pillar inner 51, that structures the vehicle transverse direction inner side, and a second quarter pillar outer 59, that structures the vehicle transverse direction outer side, being joined together.

Note that the second quarter pillar 50 in the present embodiment is the first pillar from the vehicle rear side, and the first quarter pillar 40 is the second pillar from the vehicle rear side.

As shown in FIG. 1, a connecting member 70, whose cross-sectional shape orthogonal to the length direction is a hat shape that opens toward the vehicle transverse direction inner side, is joined to the vehicle transverse direction outer side of the roof side inner panel 20. An upper end portion 72 of the connecting member 70 is joined to a border portion 55 between the second pillar inclined portion 54 and the second pillar upper end portion 56 at the second quarter pillar 50. Further, a lower end portion 74 of the connecting member 70 is joined to the joined region of the lower end portion 40A of the first quarter pillar 40 and the wheel house 30. In further detail, a side portion 74A at the vehicle front side of the lower end portion 74 of the connecting member 70 is joined to the lower end portion 40A of the first quarter pillar 40, and a side portion 74B at the vehicle lower side is joined to the wheel house 30.

Namely, the connecting member 70 is a member that is joined respectively to the second quarter pillar 50 and to the joined region of the first quarter pillar 40 and the wheel house 30, and that connects the second quarter pillar 50 and the joined region.

Further, in the present embodiment, an angle α of the connecting member 70 with respect to vehicle vertical direction S as seen in a vehicle side view is an acute angle. Note that the angle α is an angle formed by the vehicle vertical direction S and a segment that connects the upper end portion 72 of the connecting member 70, which upper end portion 72 is joined to the second quarter pillar 50, and the lower end portion 74 that is joined to the joined region of the first quarter pillar 40 and the wheel house 30.

Operation and Effects

The operation and effects of the present embodiment are described next.

Due to twisting input being applied to the vehicle 10, the second quarter pillar 50 deforms so as to fall toward the vehicle vertical direction lower side. The connecting member 70, whose lower end portion 74 is joined to the joined region of the wheel house 30 and the lower end portion 40A of the first quarter pillar 40 (the side portions 74A, 74B of the lower end portion 74 are joined to the lower end portion 40A of the first quarter pillar 40 and the wheel house 30), receives this falling-in deformation of the second quarter pillar 50.

Accordingly, the connecting member 70, whose lower end portion 74 is fixed securely, receives the falling-in deformation of the second quarter pillar 50, and therefore, falling-in deformation of the second quarter pillar 50 is effectively suppressed.

Further, in the present embodiment, the connecting member 70 is disposed such that the angle α with respect to the vehicle vertical direction S is an acute angle, as seen in a vehicle side view. Accordingly, there is a structure that receives the load F of the falling-in deformation of the second quarter pillar 50 more as axial force than as bending (twisting) deformation, and therefore, the falling-in deformation of the second quarter pillar 50 is suppressed more effectively.

Further, due the falling-in deformation of the second quarter pillar 50 being suppressed in this way, the body rigidity of the vehicle 10 improves, and the steering stability improves. Moreover, because the body rigidity of the vehicle 10 improves, it is possible to make the body lighter-weight.

Further, as shown in FIG. 2, when the rear side member 16 moves vertically (refer to arrow N1) due to road surface input when the vehicle is traveling, the wheel house inner 34 deforms so as to fall laterally in the vehicle transverse direction (refer to arrow N2).

However, the lower end portion 74 of the connecting member 70, whose upper end portion 72 is joined to the second quarter pillar 50, is joined to the wheel house 30. Accordingly, lateral falling deformation (arrow N2) of the wheel house inner 34 is suppressed, and relative displacement in the vehicle transverse direction between the wheel house inner 34 and the second quarter pillar 50 is suppressed. Accordingly, vibration (refer to arrow N3), in the vehicle transverse direction, of the roof side inner panel 20 that is due to lateral falling deformation, in the vehicle transverse direction, of the wheel house inner 34 is suppressed, and as a result, the NV performance (noise-and-vibration performance (the performance of suppressing vibrations and vibration noise)) improves.

Figure 6:
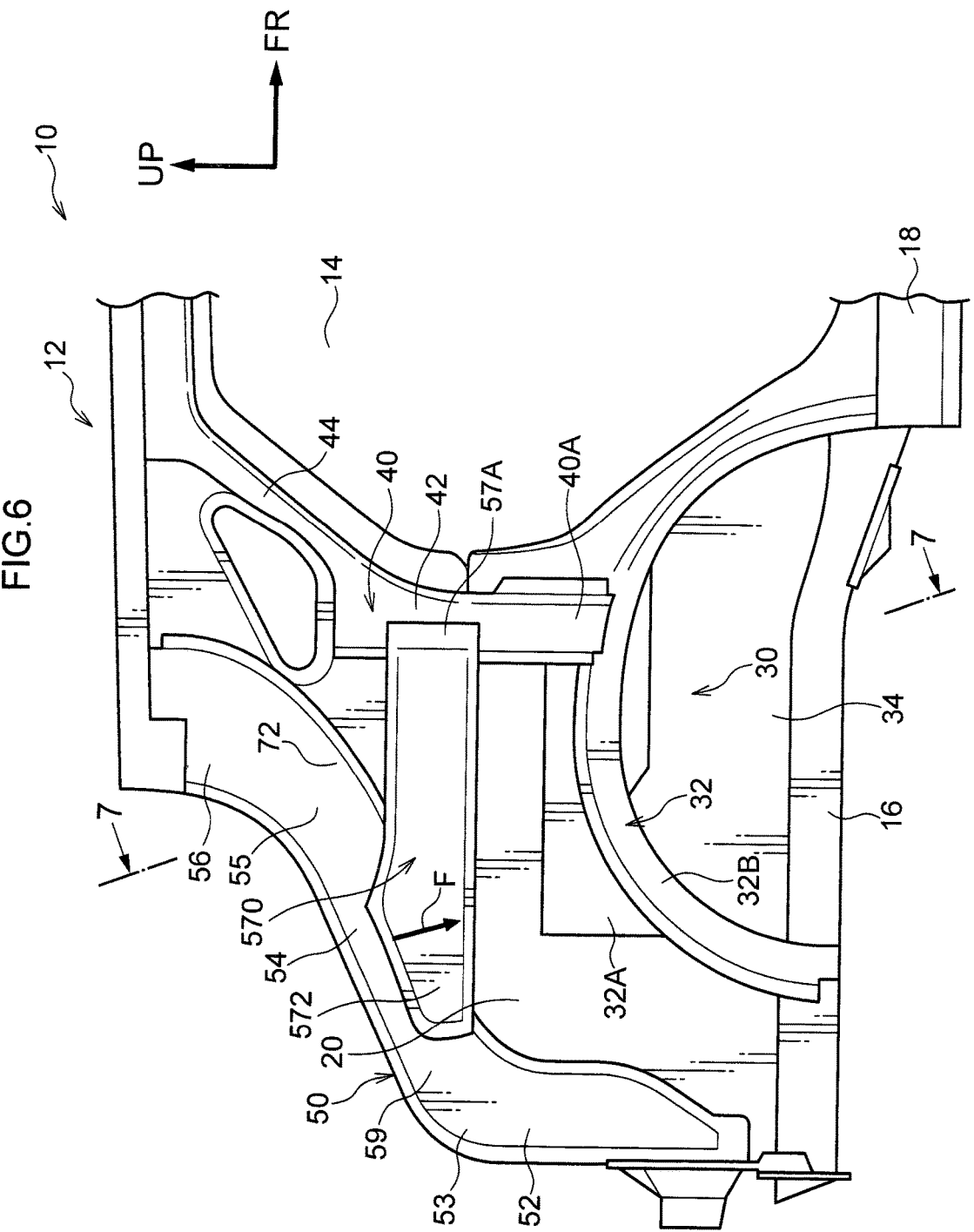
FIG. 6 is a side view in which a vehicle rear portion structure of a comparative example is viewed from the vehicle transverse direction outer side.
Figure 7:
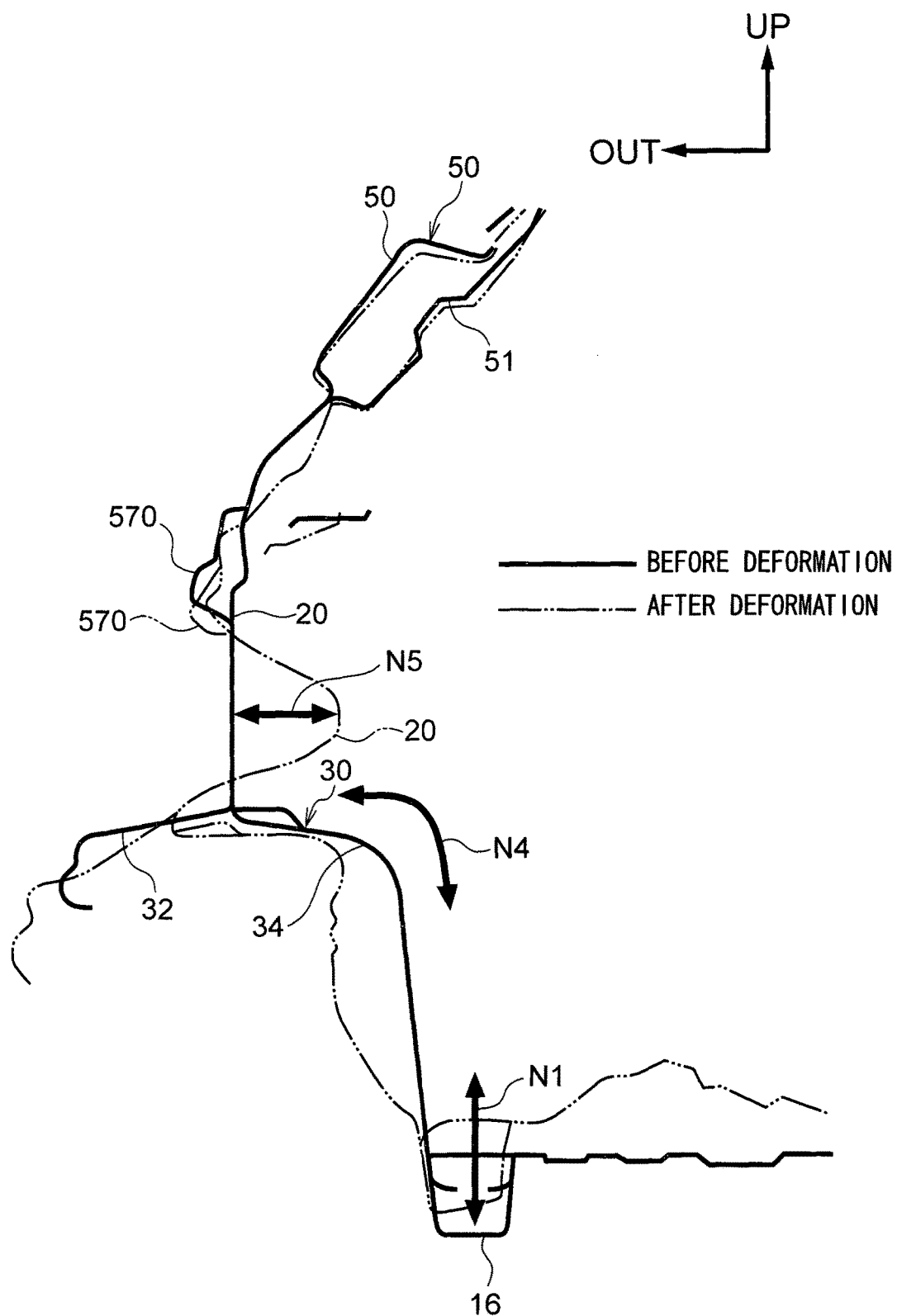
FIG. 7 is a cross-sectional view schematically showing the cross-section along line 7-7 of FIG. 6, for explaining states before deformation and after deformation of the roof side inner panel.

Here, a vehicle rear portion structure of a comparative example, that is shown in FIG. 6 and FIG. 7 and in which a connecting member 570 that is disposed substantially horizontally is joined to the first quarter pillar 40 and the second quarter pillar 50, is described.

As shown in FIG. 6, in the comparative example, a vehicle front side end portion 572 of the connecting member 570 that is disposed substantially horizontally is joined substantially orthogonally to the first pillar lower portion 42 of the first quarter pillar 40, and a vehicle rear side end portion 574 is joined to the second pillar inclined portion 54 of the second quarter pillar 50.

In the case of the comparative example, the connecting member 570 that is disposed substantially horizontally receives falling-in deformation in which the second quarter pillar 50 falls toward the vehicle vertical direction lower side. However, this is a structure in which the vehicle rear side end portion 57A of the connecting member 570 is joined substantially orthogonally to the first pillar lower portion 42 of the first quarter pillar 40, and receives load F of the falling-in deformation of the second quarter pillar 50 by bending (twisting) deformation. Accordingly, the connecting member 570 of the comparative example cannot effectively exhibit suppression of falling-in deformation of the second quarter pillar 50.

In contrast, as described above, at the connecting member 70 of the vehicle rear portion structure to which the present invention is applied, the lower end portion 74 is joined to the joined region of the wheel house 30 and the lower end portion 40A of the first quarter pillar 40 (the side portions 74A, 74B of the lower end portion 74 are joined to the lower end portion 40A of the first quarter pillar 40 and the wheel house 30), and further, the connecting member 70 is disposed such that the angle α with respect to the vehicle vertical direction S is an acute angle. Accordingly, as described above, falling-in deformation of the second quarter pillar 50 is effectively suppressed.

Further, as shown in FIG. 7, in the case of the comparative example, because the connecting member 570 is not joined to the wheel house 30, the connecting member 570 hardly at all has an effect of suppressing lateral falling deformation in the vehicle transverse direction of the wheel house inner 34, and an effect of suppressing relative displacement in the vehicle transverse direction between the wheel house inner 34 and the second quarter pillar 50.

Accordingly, vibration (refer to arrow N5), in the vehicle transverse direction, of the roof side inner panel 20 due to lateral falling deformation (arrow N4), in the vehicle transverse direction, of the wheel house inner 34 is not suppressed. Therefore, the connecting member 570 of the comparative example cannot effectively exhibit suppression of the NV performance.

In contrast, as described above, in the vehicle rear portion structure to which the present invention is applied, the lower end portion 74 of the connecting member 70, whose upper end portion 72 is joined to the second quarter pillar 50, is joined to the wheel house 30. Therefore, vibration (arrow N3) in the vehicle transverse direction of the roof side inner panel 20, that is due to lateral falling deformation in the vehicle transverse direction of the wheel house inner 34, is suppressed, and as a result, the NV performance is improved more than the comparative example.

MODIFIED EXAMPLES

Modified examples of the connecting member of the present embodiment are described next.

First Modified Example

Figure 3:
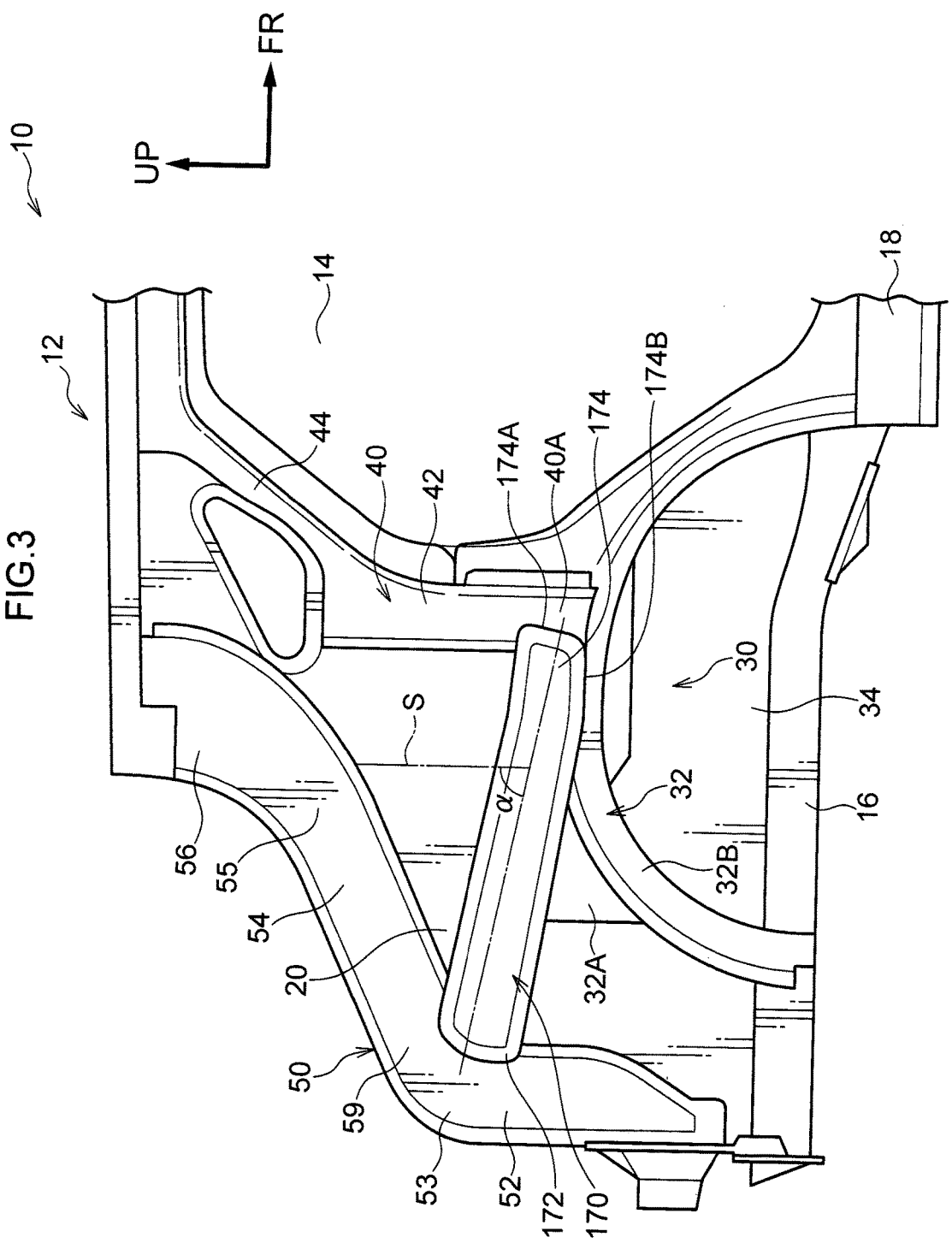
FIG. 3 is a side view in which a vehicle rear portion structure of a first modified example of the embodiment of the present invention is viewed from the vehicle transverse direction outer side.

In a vehicle rear portion structure of a first modified example shown in FIG. 3, a connecting member 170, whose cross-sectional shape orthogonal to the length direction is a hat shape that opens toward the vehicle transverse direction inner side, is joined to the roof side inner panel 20. An upper end portion (rear end portion) 172 of the connecting member 170 is joined to a curved portion 53 that is the border between the second pillar inclined portion 54 and the second pillar lower portion 52 at the second quarter pillar 50. A lower end portion 174 of the connecting member 170 is joined to the joined region of the wheel house 30 and the lower end portion (front end portion) 40A of the first quarter pillar 40.

In further detail, a side portion 174A at the vehicle front side of the lower end portion 174 of the connecting member 170 is joined to the lower end portion 40A of the first quarter pillar 40, and a side portion 174B at the vehicle lower side is joined to the wheel house 30.

Further, the connecting member 170 is disposed such that the angle α with respect to the vehicle vertical direction S is an acute angle, as seen in a vehicle side view.

In the present first modified example as well, the connecting member 170, whose lower end portion 174 is securely fixed, receives the falling-in deformation in which the second quarter pillar 50 deforms so as to fall toward the vehicle vertical direction lower side. Therefore, falling-in deformation of the second quarter pillar 50 is suppressed. Further, due to falling-in deformation of the second quarter pillar 50 being suppressed, the body rigidity of the vehicle 10 improves, and the steering stability improves.

Note that the curved portion 53 that is the border between the second pillar inclined portion 54 and the second pillar lower portion 52 at the second quarter pillar 50, is a region where the change in the angle due to falling-in deformation is large. However, due to the upper end portion 172 of the connecting member 170 being joined to this region, falling-in deformation of the second quarter pillar 50 is effectively suppressed.

Further, owing to the connecting member 170 that is joined to the wheel house 30 and the second quarter pillar 50, lateral falling deformation in the vehicle transverse direction of the wheel house inner 34 is suppressed, and relative displacement in the vehicle transverse direction between the wheel house inner 34 and the second quarter pillar 50 is suppressed. Accordingly, vibration (refer to N3) in the vehicle transverse direction of the roof side inner panel 20 due to lateral falling deformation of the wheel house inner 34 is suppressed, and as a result, the NV performance improves.

Second Modified Example

Figure 4:
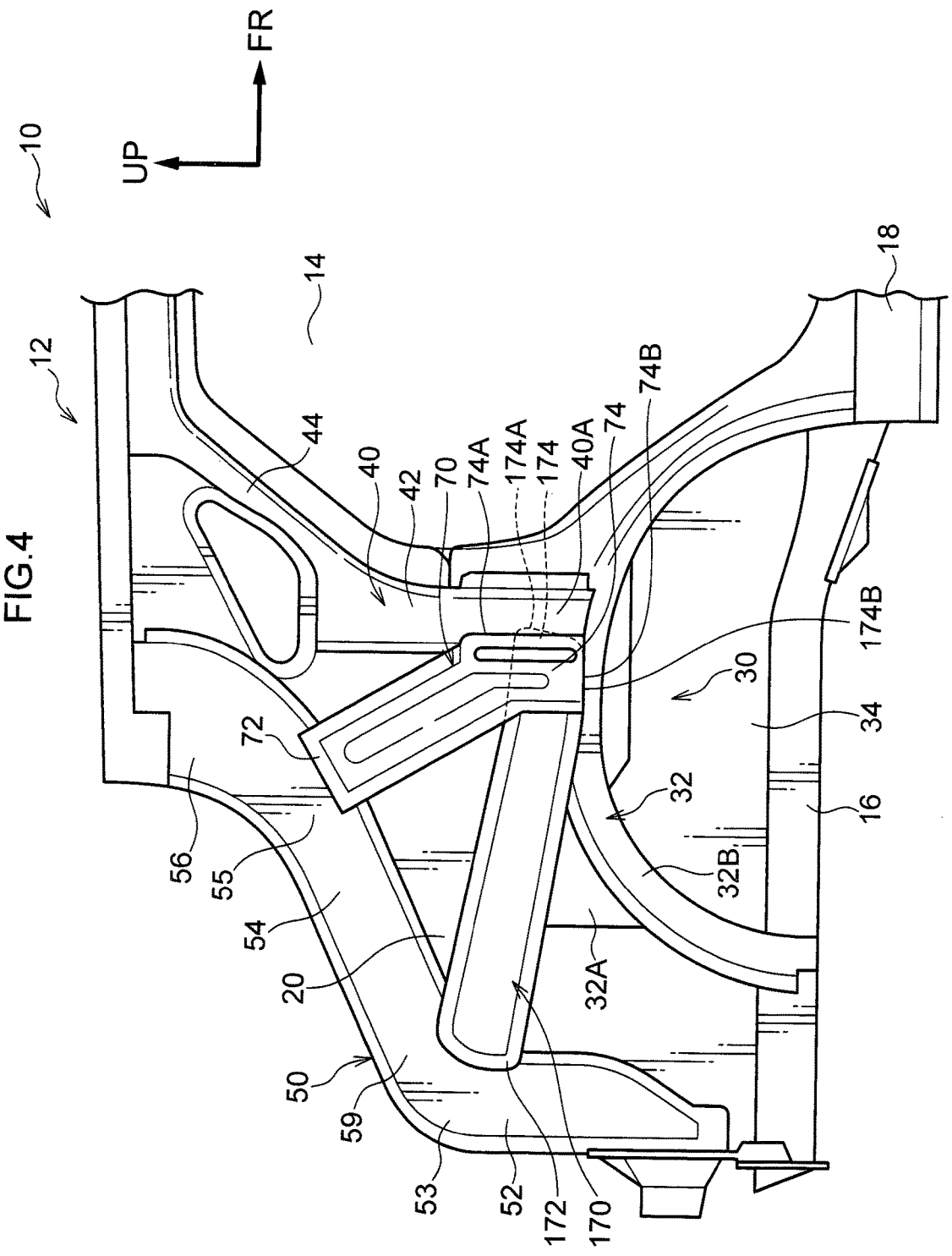
FIG. 4 is a side view in which a vehicle rear portion structure of a second modified example of the embodiment of the present invention is viewed from the vehicle transverse direction outer side.

In a vehicle rear portion structure of a second modified example shown in FIG. 4, there is a structure in which the connecting member 70 of the above-described embodiment (see FIG. 1) and the connecting member 170 of the first modified example (see FIG. 3) are disposed in a V-shape as seen in a vehicle side view, and are respectively joined to the roof side inner panel 20. Note that the lower end portion 74 of the connecting member 70 and the lower end portion 174 of the connecting member 170 are superposed one on another and are joined together in the vehicle transverse direction.

Further, by providing the two connecting members that are the connecting member 70 and the connecting member 170 in this way, falling-in deformation of the second quarter pillar 50 is more effectively suppressed, and relative displacement in the vehicle transverse direction between the wheel house inner 34 and the second quarter pillar 50 is suppressed. Accordingly, the steering stability and the NV performance improve more effectively.

Note that, in the present modified example, there are the connecting member 70 and the connecting member 170 that are separate members, but there may be a V-shaped connecting member in which these are made integral (a single part structure).

Third Modified Example

Figure 5:
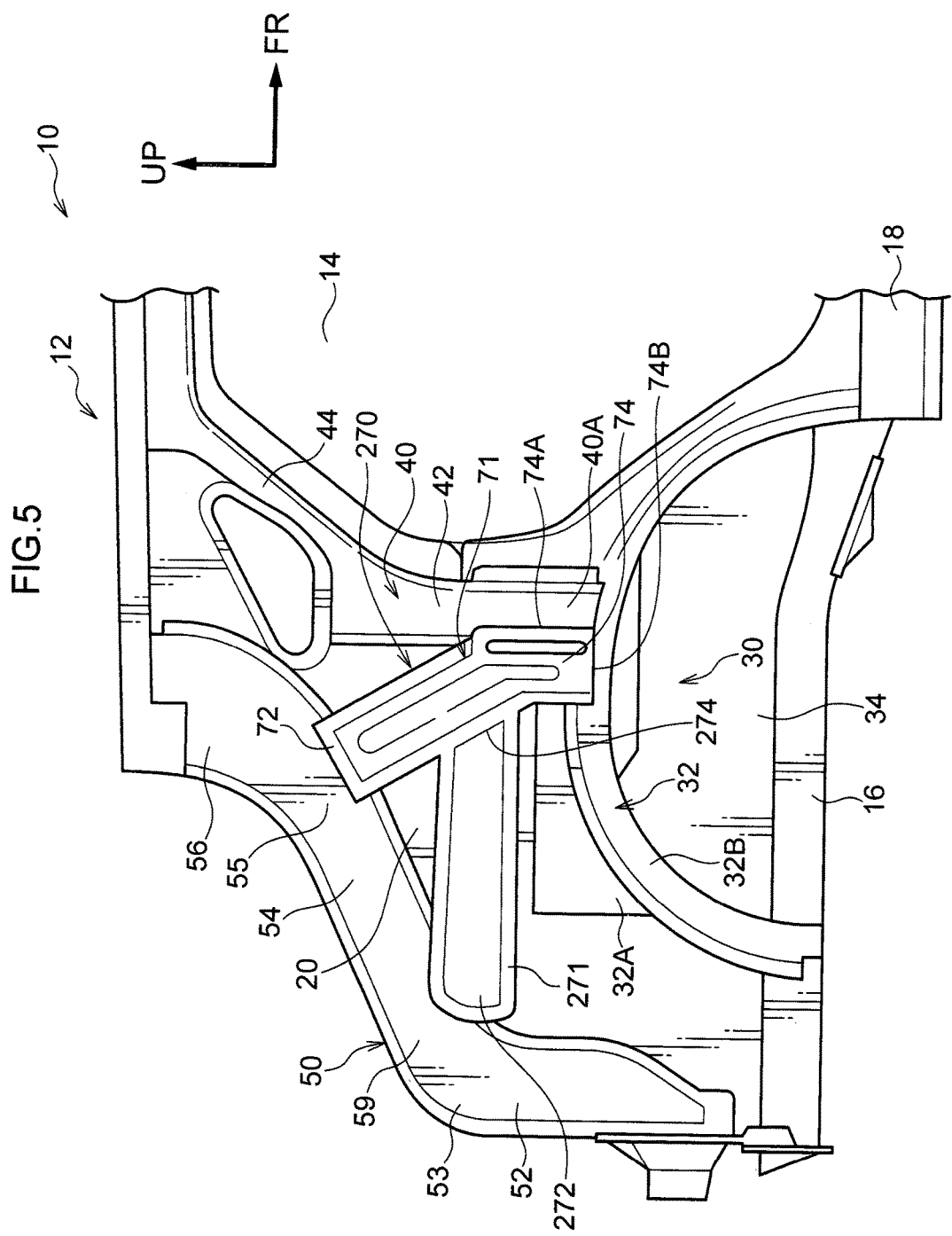
FIG. 5 is a side view in which a vehicle rear portion structure of a third modified example of the embodiment of the present invention is viewed from the vehicle transverse direction outer side.

In a vehicle rear portion structure of a third modified example shown in FIG. 5, a connecting member 270 is a Y-shaped structure as seen in side view in which a branched-off portion 271 extends substantially horizontally toward the vehicle rear side from a main body portion 71 that is structured similarly to the connecting member 70 of the above-described embodiment (see FIG. 1). The cross-sectional shape, that is orthogonal to the length direction, of the branched-off portion 271 is a hat shape that opens toward the vehicle transverse direction inner side, and a distal end portion 272 of the branched-off portion 271 is joined to the curved portion 53 at the second quarter pillar 50.

Further, by employing the Y-shaped connecting member 270 at which the branched-off portion 271 is provided in this way, falling-in deformation of the second quarter pillar 50 is more effectively suppressed, and relative displacement in the vehicle transverse direction between the wheel house inner 34 and the second quarter pillar 50 is suppressed. Accordingly, the steering stability and the NV performance improve more effectively.

Other Points

Note that the present invention is not limited to the above-described embodiment.

For example, in the above-described embodiment and modified examples, there are one or two connecting members. However, the present invention is not limited to this, and may be a structure having three or more connecting members.

Further, it goes without saying that the present invention can be implemented in various forms within a scope that does not depart from the gist thereof.

The disclosure of Japanese Patent Application No. 2013-245320 filed Nov. 27, 2013 is incorporated herein by reference in its entirety.

All publications, patent applications, and technical standards mentioned in this specification are herein incorporated by reference to the same extent as if each individual publication, patent application or technical standard was specifically and individually indicated to be incorporated by reference.

The invention claimed is:

1. A vehicle rear portion structure comprising:
    a first quarter pillar that extends in a vehicle vertical direction at a vehicle rear side of a vehicle side portion, and whose lower end portion is joined to a wheel house;
    a second quarter pillar that is provided at a vehicle rear side of the first quarter pillar and extends in the vehicle vertical direction; and
    a connecting member that is a separate member from the first quarter pillar, the connecting member being directly joined to the second quarter pillar and to a joined region of the first quarter pillar and the wheel house, and connecting the second quarter pillar and the joined region.

2. The vehicle rear portion structure of claim 1, wherein the connecting member is disposed at an acute angle with respect to the vehicle vertical direction as seen in a vehicle side view.

3. The vehicle rear portion structure of claim 1, wherein cross-sectional shape of the connecting member orthogonal to the length direction is a hat shape that opens toward the vehicle transverse direction inner side, an upper end portion of the connecting member is joined to a curved portion at the second quarter pillar, and a lower end portion of the connecting member is joined to a joined region of the wheel house and the lower end portion of the first quarter pillar.

4. The vehicle rear portion structure of claim 1, further comprising a second connecting member, wherein cross-sectional shape of the second connecting member orthogonal to the length direction is a hat shape that opens toward the vehicle transverse direction inner side, an upper end portion of the second connecting member is joined to a curved portion at the second quarter pillar, and a lower end portion of the second connecting member is joined to a joined region of the wheel house and the lower end portion of the first quarter pillar.

* * * * *